US010223612B2

(12) United States Patent
Hua et al.

(10) Patent No.: US 10,223,612 B2
(45) Date of Patent: Mar. 5, 2019

(54) FRAME AGGREGATION NETWORK FOR SCALABLE VIDEO FACE RECOGNITION

(71) Applicant: Microsoft Technology Licensing, LLC, Redmond, WA (US)

(72) Inventors: Gang Hua, Sammamish, WA (US); Peiran Ren, Beijing (CN); Jiaolong Yang, Beijing (CN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 99 days.

(21) Appl. No.: 15/254,410

(22) Filed: Sep. 1, 2016

(65) Prior Publication Data

US 2018/0060698 A1 Mar. 1, 2018

(51) Int. Cl.
*G06K 9/62* (2006.01)
*G06K 9/00* (2006.01)

(52) U.S. Cl.
CPC ....... *G06K 9/6257* (2013.01); *G06K 9/00744* (2013.01); *G06K 9/623* (2013.01); *G06K 9/00268* (2013.01)

(58) Field of Classification Search
USPC ........................................................ 382/156
See application file for complete search history.

(56) References Cited

U.S. PATENT DOCUMENTS

| 7,127,087 | B2 | 10/2006 | Huang et al. |
| 8,081,816 | B1 | 12/2011 | Irick et al. |
| 8,442,927 | B2 | 5/2013 | Chakradhar et al. |
| 8,498,455 | B2 | 7/2013 | Ke et al. |
| 9,076,043 | B2 * | 7/2015 | Kumar ............... G06K 9/00765 |
| 9,147,117 | B1 | 9/2015 | Madhu et al. |

(Continued)

FOREIGN PATENT DOCUMENTS

WO 2015120351 A1 8/2015

OTHER PUBLICATIONS

Kahou, et al., "Recurrent Neural Networks for Emotion Recognition in Video", In Proceedings of the ACM on International Conference on Multimodal Interaction, Nov. 9, 2015, 8 pages.

(Continued)

*Primary Examiner* — Jerome Grant, II
(74) *Attorney, Agent, or Firm* — Drinker Biddle & Reath LLP (57) ABSTRACT

In a video frame processing system, a feature extractor generates, based on a plurality of data sets corresponding to a plurality of frames of a video, a plurality of feature sets, respective ones of the feature sets including features extracted from respective ones of the data sets. A first stage of the feature aggregator generates a kernel for a second stage of the feature aggregator. The kernel is adapted to content of the feature sets so as to emphasize desirable ones of the feature sets and deemphasize undesirable ones of the feature sets. In the second stage of the feature aggregator the kernel generated by the first stage is applied to the plurality of feature sets to generate a plurality of significances corresponding to the plurality of feature sets. The feature sets are weighted based on corresponding significances and weighted feature sets are aggregated to generate an aggregated feature set.

20 Claims, 5 Drawing Sheets

(56) References Cited

U.S. PATENT DOCUMENTS

| | | | |
|---|---|---|---|
| 2014/0037215 A1* | 2/2014 | Kumar | G06K 9/00718 |
| | | | 382/197 |
| 2014/0037216 A1* | 2/2014 | Kumar | G06K 9/00751 |
| | | | 382/197 |
| 2015/0106311 A1 | 4/2015 | Birdwell et al. | |
| 2015/0178554 A1 | 6/2015 | Kanaujia et al. | |
| 2017/0308992 A1* | 10/2017 | Chalom | G06T 3/0093 |
| 2017/0329769 A1* | 11/2017 | Berg | G06F 17/3002 |
| 2017/0332075 A1* | 11/2017 | Karczewicz | H04N 19/107 |

OTHER PUBLICATIONS

Parkhi, et al., "Deep Face Recognition", In Proceedings of the British Machine Vision, vol. 1, Issue 3, Sep. 7, 2015, pp. 1-12.

Li, et al., "A Convolutional Neural Network Cascade for Face Detection", In Proceedings of IEEE Conference on Computer Vision and Pattern Recognition, Jun. 7, 2015, pp. 5325-5334.

Silva, et al., "Real-time Facial Feature Extraction and Emotion Recognition", In Proceedings of the Joint Conference of the Fourth International Conference on Information, Communications and Signal Processing, vol. 3, Dec. 15, 2003, pp. 1310-1314.

Ng, et al., "Beyond Short Snippets: Deep Networks for Video Classification", In Proceedings of IEEE Conference on Computer Vision and Pattern Recognition, Jun. 7, 2015, pp. 4694-4702.

Wolf, wt al., "Face recognition in unconstrained videos with matched background similarity", In Proceedings of IEEE Conference on Computer Vision and Pattern Recognition, Jun. 20, 2011, 6 pages.

Li, et al., "Probabilistic Elastic Matching for Pose Variant Face Verification", In Proceedings of the IEEE Conference on Computer Vision and Pattern Recognition, Jun. 23, 2013, pp. 529-534.

Wolf, et al., "The SVM-minus Similarity Score for Video Face Recognition", In Proceedings of IEEE Conference on Computer Vision and Pattern Recognition, Jun. 2013, pp. 3499-3506.

Cui, et al., "Fusing robust face region descriptors via multiple metric learning for face recognition in the wild", In Proceedings of the IEEE Conference on Computer Vision and Pattern Recognition, Jun. 23, 2013, pp. 1-8.

Mendez-Vazquez, et al., "Volume structured ordinal features with background similarity measure for video face recognition", In Proceedings of International Conference on Biometrics, Jun. 4, 2013, pp. 3554-3561.

Li, et al., "Eigen-pep for video face recognition", In Proceedings of 12th Asian Conference on Computer Vision, Nov. 1, 2014, pp. 17-33.

Liu, et al., "Toward Large-Population Face Identification in Unconstrained Videos", In Journal of IEEE Transactions on Circuits and Systems for Video Technology, vol. 24, Issue 11, Nov. 2014, pp. 1874-1884.

Parkhi, et al., "A Compact and Discriminative Face Track Descriptor", In Proceedings of IEEE Conference on Computer Vision and Pattern Recognition, Jun. 23, 2014, pp. 1693-1700.

Hu, et al., "Discriminative Deep Metric Learning for Face Verification in the Wild", In Proceedings of IEEE Conference on Computer Vision and Pattern Recognition, Jun. 23, 2014, pp. 1875-1882.

Taigman, et al., "DeepFace: Closing the Gap to Human-Level Performance in Face Verification", In Proceedings of IEEE Conference on Computer Vision and Pattern Recognition, Jun. 23, 2014, pp. 1701-1708.

Schroff, et al., "FaceNet: A Unified Embedding for Face Recognition and Clustering", In Proceedings of IEEE Conference on Computer Vision and Pattern Recognition, Jun. 7, 2015, p. 1-9.

Graves, et al., "Neural turing machines", In Journal of Computing Research Repository, Oct. 2014, pp. 1-26.

Vinyals, et al., "Order Matters: Sequence To Sequence for Sets", In Proceedings of International Conference on Learning Representation, Retrieved on: Apr. 27, 2016, pp. 1-11.

Hochreiter, et al., "Long Short-Term Memory", In Journal of Neural Computation, vol. 9, Issue 8, Nov. 15, 1997, pp. 1-32.

Klare, et al., "Pushing the Frontiers of Unconstrained Face Detection and Recognition: IARPA Janus Benchmark A" In the Twenty-Eighth IEEE Conference on Computer Vision and Pattern Recognition, Jun. 8, 2015, 9 pages.

Jegou, et al., "Aggregating local descriptors into a compact image representation", In Proceedings of IEEE Conference on Computer Vision and Pattern Recognition, Jun. 13, 2010, pp. 3304-3311.

Douze, et al., "Stable Hyper-Pooling and Query Expansion for Event Detection", In Proceedings of IEEE International Conference on Computer Vision, Dec. 1, 2013, pp. 1825-1832.

Jegou, et al., "Triangulation Embedding and Democratic Aggregation for Image Search", In Proceedings of the IEEE Conference on Computer Vision and Pattern Recognition, Jun. 23, 2014, pp. 3310-3317.

Cao, et al., "Scene Aligned Pooling for Complex Video Recognition", In Proceedings of the 12th European Conference on Computer Vision, Part II, Oct. 7, 2012, pp. 1-14.

Chopra, et al., "Learning a Similarity Metric Discriminatively, with Application to Face Verification", In Proceedings of IEEE Computer Society Conference on Computer Vision and Pattern Recognition, vol. 1, Jun. 20, 2005, 8 pages.

Szegedy, et al., "Going Deeper with Convolutions", In Proceedings of the IEEE Conference on Computer Vision and Pattern Recognition, Jun. 7, 2015, pp. 1-9.

Ioffe, et al., "Batch Normalization: Accelerating Deep Network Training by Reducing Internal Covariate Shift", In Proceedings of the 32nd International Conference on Machine Learning, Jul. 6, 2015, 9 pages.

Hadsell, et al., "Dimensionality Reduction by Learning an Invariant Mapping", In Proceedings of IEEE Computer Society Conference on Computer Vision and Pattern Recognition, vol. 2, Jun. 17, 2006, pp. 1-8.

Hu, et al., "Large Margin Multi-Metric Learning for Face and Kinship Verification in the Wild", In Proceedings of 12th Asian Conference on Computer Vision, Part III, Nov. 1, 2014, 16 pages.

Sun, et al., "Deeply Learned Face Representations are Sparse, Selective, and Robust", In Proceedings of the IEEE Conference on Computer Vision and Pattern Recognition, Jun. 7, 2015, pp. 1-12.

Chen, et al., "Joint Cascade Face Detection and Alignment", In Proceedings of 13th European Conference on Computer Vision, Sep. 6, 2014, pp. 1-14.

Ren, et al., "Face Alignment at 3000 Fps via Regressing Local Binary Features", In Proceedings of the IEEE Conference on Computer Vision and Pattern Recognition, Jun. 23, 2014, pp. 1685-1692.

Klontz, et al., "Open Source Biometric Recognition", In Proceedings of IEEE Sixth International Conference on Biometrics: Theory, Applications and Systems, Sep. 29, 2013, pp. 1-8.

Wang, et al., "Face Search at Scale: 80 Million Gallery", In Technical Report of MSU-CSE-15-11, Jul. 24, 2015, pp. 1-14.

Chen, et al., "An End-to-End System for Unconstrained Face Verification with Deep Convolutional Neural Networks", In Proceedings of the IEEE International Conference on Computer Vision Workshops, Dec. 7, 2015, pp. 118-126.

* cited by examiner

FRAME AGGREGATION NETWORK FOR SCALABLE VIDEO FACE RECOGNITION

FIELD OF THE DISCLOSURE

The present disclosure relates generally to image processing and, more particularly, to scalable frame aggregation techniques for video subject recognition.

BACKGROUND

Image recognition techniques oftentimes are used to locate, identify, and/or verify one or more subjects appearing in an image or in a video. Some image recognition techniques involve extracting a set of landmarks or features from an image, and comparing the extracted set of landmarks or features with corresponding features extracted form one or multiple other images in order to identify or verify the image. For example, in face recognition, one or more traits may be extracted from an image of a face, such as position, size and/or shape of the eyes, nose, cheekbones, etc. in the face, and these extracted traits may be compared with corresponding traits extracted from one or more other images to verify or to identify the face.

As compared to subject recognition based on a single image such as a photograph, video recognition typically involves analyzing more information that may be available for the subject in multiple frames of a video. For example, a face in a video may appear in various poses and illumination conditions across different frames of the video. In some video subject recognition systems, information across multiple frames of a video is integrated into a visual representation of a subject in the video, and the visual representation is then analyzed to verify or identify the subject in the video. For example, a face in a video may be represented by sets of features extracted from respective frames of the video. Such visual representation may comprehensively maintain information across multiple frames of the video. However, subject recognition in such systems is generally computationally intensive because multiple pairs of frames of respective videos must be compared, and multiple matching results must be analyzed. Thus, for example, a comparison of two videos each having n frames has computational complexity of $O(n^2)$, which is not desirable in many situations. Moreover, maintaining respective sets of features extracted from multiple frames of a video generally requires high degrees of storage and indexing complexity as well.

To reduce computational and storage complexity, some systems aggregate information corresponding to multiple frames of a video, such as respective sets of features extracted from the multiple frames of the video, to generate an aggregated representation of the video, and perform recognition analysis based on the aggregated representation of the video. Various pooling techniques have been employed to aggregate respective sets of features extracted from multiple frames of a video. For example, average pooling or max pooling has been used to combine multiple sets of features extracted from frames of a video. As another example, a more general feature encoding scheme, such as Fisher Vector coding, has been also employed. Such aggregation techniques, however, result in a less accurate representation of the subject in the video, and leads to less accurate or incorrect identification and/or verification of the subject in the video.

SUMMARY

According to an embodiment, a video frame processing system comprises a feature extractor configured to receive a plurality of data sets, wherein respective ones of the data sets correspond to respective frames of a video, and generate a plurality of feature sets corresponding to the plurality of data sets, wherein respective ones of the feature sets include corresponding features extracted from respective ones of the data sets. The video frame processing system further comprises a feature aggregator having a first stage and a second stage, the feature aggregator configured to generate, in the first stage based on the plurality of feature sets, a kernel for the second stage, wherein the kernel is adapted to content of the plurality of feature sets so as to emphasize ones of the feature sets and deemphasize other ones of the feature sets, and generate, in the second stage based on the plurality of feature sets, the aggregated feature set. Generating the aggregated feature set includes applying, to the plurality of feature sets, the kernel to generate a plurality of significances corresponding to the plurality of feature sets, weighing respective ones of the feature sets based on corresponding significances of the plurality of significances to generate a plurality of weighted feature sets, and aggregating the plurality of weighted feature sets to generate the aggregated feature set.

In another embodiment, a tangible, non-transitory computer readable medium, or media, storing machine readable instructions that, when executed by one or more processors, cause the one or more processors to receive a plurality of data sets, wherein respective ones of data sets correspond to respective frames of a video, and generate a plurality of feature sets corresponding to the plurality of data sets, wherein respective ones of the feature sets include corresponding features extracted from respective ones of the data sets. The machine readable instructions, when executed by the one or more processors, further cause the one or more processors to generate, in a first stage of a feature aggregator based on the plurality of feature sets, a kernel for a second stage of the feature aggregator, wherein the kernel is adapted to content of the plurality of feature sets so as to emphasize ones of the feature sets and deemphasize other ones of the feature sets, and generate, in the second stage based on the plurality of feature sets, an aggregated feature set. Generating the aggregated feature set includes applying, to the plurality of feature sets, the kernel to generate a plurality of significances corresponding to the plurality of feature sets, weighing respective ones of the feature sets based on corresponding significances of the plurality of significances to generate a plurality of weighted feature sets, and aggregating the plurality of weighted feature sets to generate the aggregated feature set.

In still another embodiment, a method for processing video frames in a video image processing system includes receiving, at a processor, a plurality of data sets, wherein respective ones of the data sets correspond to respective frames of a video, and generating, with the processor, a plurality of feature sets corresponding to the plurality of data sets, wherein respective ones of the feature sets include corresponding features extracted from respective ones of the data sets. The method further includes generating, with the processor, a kernel based on the plurality of feature sets, wherein the kernel is generated based on content of the plurality of feature sets so as to emphasize ones of the feature sets and deemphasize other ones of the feature sets, and generating, with the processor, an aggregated feature set based on the plurality of feature sets. Generating the aggregated feature set includes applying, to the plurality of feature sets, the kernel to generate a plurality of significances corresponding to the plurality of feature sets, weighing respective ones of the feature sets based on corresponding significances of the plurality of significances to generate a plurality of weighted feature sets, and aggregating the plurality of weighted feature sets to generate the aggregated feature set.

DETAILED DESCRIPTION

In various embodiments described below, a video image processing system may generate identification and/or verification decisions for various subjects in videos based on feature sets extracted from multiple frames of the videos. The video image processing system includes a feature aggregator that aggregates feature sets extracted from multiple frames of a video into an aggregated feature set that represents the multiple frames of the video. The feature aggregator includes a first stage and a second stage. The first stage of the feature aggregator processes the feature sets to generate, based on the feature sets, a kernel adapted to the content of the feature sets. The kernel is adapted to the content of the feature sets so as to emphasize desirable ones of the feature sets and deemphasize undesirable ones of the feature sets. The kernel is provided to the second stage of the feature aggregator. The second stage of the feature aggregator applies the kernel to the feature sets to generate a plurality of significances corresponding to the plurality of feature sets, and generates, based on the plurality of significances, weights for combining the feature sets. The feature aggregator then generates a weighted combination of the feature sets using the weights generated based on the significances corresponding to the feature sets. Generating weights for combining the feature sets using the kernel adapted to the content of the feature sets results in weights that emphasize desirable ones of the feature sets and deemphasizes undesirable ones of the feature sets, in an embodiment. Emphasizing desirable ones of the feature sets and deemphasizing undesirable ones of the feature sets prior to combining the feature sets may, in turn, result in a more discriminative representation of the video frames, and generally leads to more accurate recognition decisions as compared to systems in which predetermined or averaged weights are used for combining feature sets.

Figure 1:
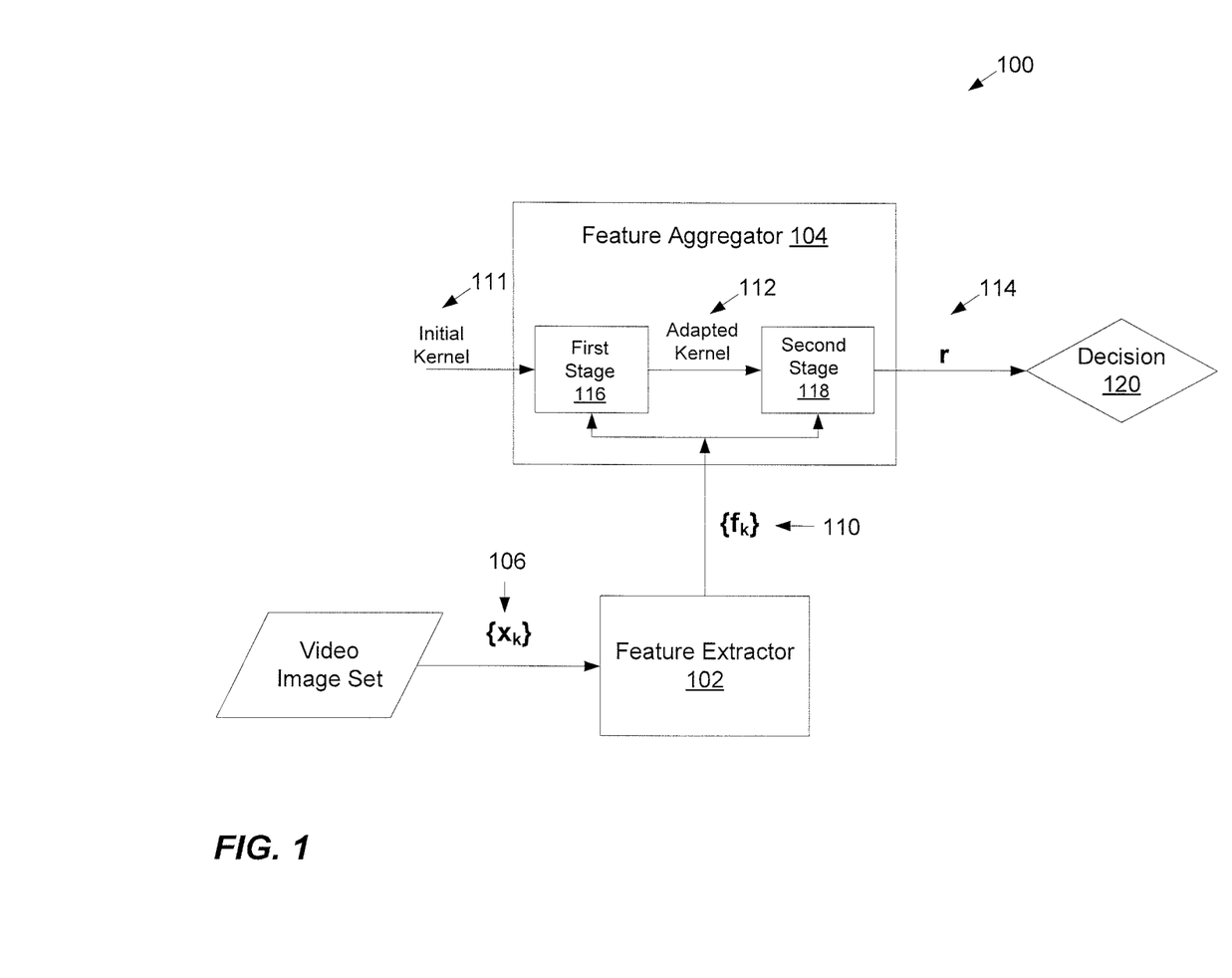
FIG. 1 is a block diagram of an example video image processing system, according to an embodiment.

FIG. 1 is a block diagram of an example video processing system 100, according to an embodiment. The video processing system 100 includes a feature extractor 102 and a feature aggregator 104. The feature extractor 102 receives a plurality of data sets $\{x_k\}$ 106 corresponding to a plurality of frames of a video, and generates, based on respective ones of the data sets $\{x_k\}$ 106, respective feature sets $\{f_k\}$ 110 that include corresponding features extracted from different ones of the data sets data sets $\{x_k\}$ 106. Each feature set $\{f_k\}$ 110 may be a data structure, such as a vector, that includes a plurality of elements indicating respective features extracted from respective data sets $\{x_k\}$. For example, respective ones of the feature sets $\{f_k\}$ 110 may include indications of facial features, such as position, size and/or shape of the eyes, nose, cheekbones, etc, extracted from respective frames of a video. The feature extractor 106 may operate on the data sets $\{x_k\}$ 106 to embed each data set x to a respective feature set f that includes a set of features generated based on the data set x. In an embodiment, the feature extractor 102 implements a neural network, such as a deep convolutional neural network (CNN) or another suitable type of neural network to embed a data set x to a corresponding feature set f. In another embodiment, the feature extractor 106 implements a suitable neural network other than a CNN to embed respective data sets x to corresponding feature sets f, or implements a suitable feature extraction system other than a neural network to embed respective data sets x to corresponding feature sets f.

The feature sets $\{f_k\}$ 110 may be provided to the feature aggregator 104. The feature aggregator 104 aggregates the plurality of feature sets $\{f_k\}$ 110 to generate an aggregated feature set r 114 representing the plurality of feature sets $\{f_k\}$ 110. The feature aggregator 106 may include a plurality of cascaded stages, including at least a first stage 116 and a second stage 118. The first stage 116 may operate on the plurality of feature sets $\{f_k\}$ 110 using an initial kernel 111 to generate an adapted kernel 112 to be used by the second stage 118. The adapted kernel 112 may be generated based on content of the plurality of feature sets $\{f_k\}$ 110 so as to emphasize certain ones of the feature sets $\{f_k\}$ 110, such as relatively less noisy feature sets $\{f_k\}$ 110, while de-emphasizing other ones of the feature sets $\{f_k\}$ 110, such as relatively more noisy ones of the feature seta $\{f_k\}$ 110. The second stage 118 may apply the adapted kernel 112 to the plurality of feature seta $\{f_k\}$ 110 to generate a plurality of significances corresponding to the plurality of feature sets $\{f_k\}$ 110. The second stage 116 may then aggregate the plurality of feature sets $\{f_k\}$ 110 to generate an aggregated feature set r 114. For example, the second stage 118 may calculate a weighted combination of the plurality of feature sets $\{f_k\}$ 110 to generate the aggregated feature set r 114, where respective ones of the feature sets $\{f_k\}$ 110 are weighted based on corresponding significances generated for the feature sets $\{f_k\}$ 110. In this manner, the first stage 116 adapts a kernel of the second stage 118 to the content of the feature sets $\{f_k\}$ 110 such that the second stage 118 generates an aggregated feature set r 114 that effectively emphasizes certain ones of the feature sets $\{f_k\}$ 110, such as relatively less noisy feature sets $\{f_k\}$ 110, while de-emphasizing other ones of the feature sets $\{f_k\}$ 110, such as relatively more noisy ones of the feature seta $\{f_k\}$ 110, in an embodiment.

Although the feature aggregator 106 is illustrated as having only two cascaded stages 116, 118, the feature aggregator 106 may include one or more additional cascaded stages, in some embodiments. For example, an additional stage may be provided between the first stage 116 and the second stage 118, and the additional stage may use the adapted kernel 112 generated by the stage 116 to further adapt the kernel prior to providing the kernel to the stage 118.

The aggregated feature set r 114 may be of a fixed size regardless of the number of feature sets $\{f_k\}$ 110 that are aggregated to generate the feature set r 114. Thus, the feature aggregator 104 may handle videos of various sizes in a uniform manner by generating aggregated feature sets of a same size that is independent of video size. Further, the aggregated feature set r 114 may be an order invariant representation of the frames of the video, in an embodiment. Thus, for example, the feature aggregator 104 may generate a same aggregated feature set based on multiple feature sets corresponding to a video irrespective of an order in which the multiple feature sets are presented to the feature aggregator 104, in an embodiment.

With continued reference to FIG. 1, the aggregated feature set r may be provided to a decision processor 120, in an embodiment. The decision processor 120 may generate a recognition decision for a subject, such as a person's face, in the video represented by the data set $\{x_k\}$ 106. For example, the decision processor 120 may generate an identification decision to identify a face in the video represented by the set of data sets $\{x_k\}$ 106. As another example, the decision processor 120 may generate a verification decision to verify identity of a face in the video represented by the set of data sets $\{x_k\}$ 106. As yet another example, multiple faces in the video may be identified or verified. Additionally or alternatively, subjects other than faces in the video may be verified or identified.

Figure 2:
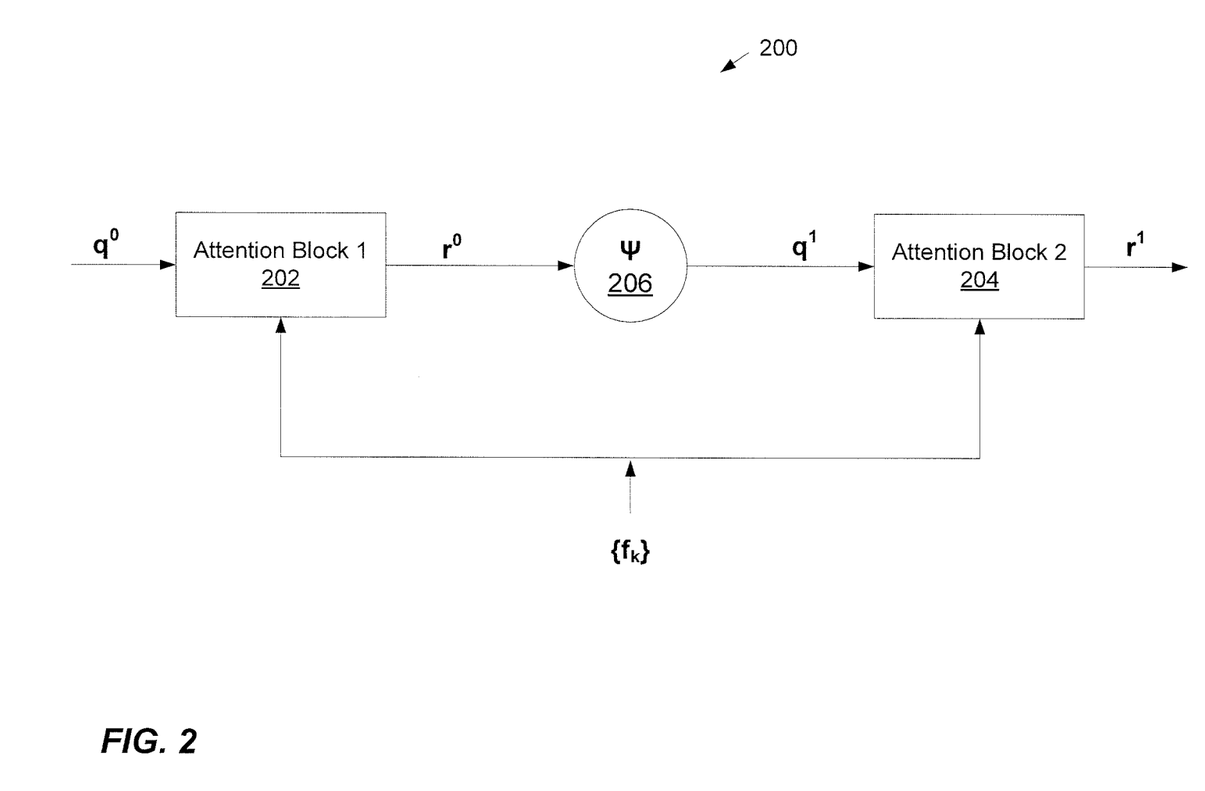
FIG. 2 is a diagram of an example adaptive feature aggregator used with the video image processing system of FIG. 1, according to an embodiment.

FIG. 2 is a block diagram of a feature aggregator 200, according to an embodiment. In an embodiment, the feature aggregator 200 corresponds to the feature aggregator 104 of the video processing system 100 of FIG. 1. In another embodiment, the feature aggregator 200 is used with a suitable processing system different from the video processing system 100 of FIG. 1. Similarly, the video processing system 100 of FIG. 1 utilizes a frame aggregator different from the frame aggregator 200. For ease of explanation, the feature aggregator 200 is described with reference to FIG. 1.

The feature aggregator 200 includes a first attention block 202 and a second attention block 204. Referring to FIG. 1, the first attention block 202 corresponds to the first stage 116 of the feature aggregator 104, and the second attention block 204 corresponds to the second stage 118 of the feature aggregator 104, in an embodiment. The feature aggregator 200 additionally includes a transformation layer 206 provided between the first attention block 202 and the second attention block 204. In operation, the first attention block 202 may receive a plurality of feature sets $\{f_k\}$ and may apply an initial kernel $q^0$ to the feature sets $\{f_k\}$ to generate a plurality of initial scalar significances respectively corresponding to the feature sets $\{f_k\}$. The first attention block 202 may generate a plurality of initial weights based on the plurality of initial scalar significances, for example by normalizing ones of the initial scalar significances with respect to a combination of the initial scalar significances. The first attention block 202 may then generate an initial aggregated feature set $r^0$ by generating a weighted combination of the plurality of feature sets $\{f_k\}$, where respective ones of the plurality of feature sets MI are weighted with corresponding initial weights of the plurality of initial weights.

The initial aggregated feature set $r^0$ may be provided to the transformation layer 206. The transformation layer 206 may apply a suitable transformation function to the initial aggregated feature set $r^0$ to generate an adapted kernel $q^1$ for the second attention block 204. The second attention block 204 may generally operate in the same manner as the first attention block 202 to generate an aggregated feature set $r^1$ using the adapted kernel $q^1$. The second attention block 204 may apply the adapted kernel $q^1$, generated by the first attention block 202, to the plurality of feature sets $\{f_k\}$ to generate a plurality of scalar significances corresponding to the plurality of feature sets $\{f_k\}$. The second attention block 204 may then generate a plurality of weights based on the plurality of scalar significances, for example by normalizing ones of the scalar significances with respect to a combination of the scalar significances. The second attention block 204 may then generate the aggregated feature set $r^1$ by generating a weighted combination of the plurality of feature sets $\{f_k\}$, where respective ones of the plurality of feature sets $\{f_k\}$ are weighted with corresponding weights of the plurality of weights.

The aggregated feature set $r^1$ generated by the feature aggregator 200 may be of a fixed size regardless of the number k of feature sets in the plurality of feature sets $\{f_k\}$. As just an example, the aggregated feature set $r^1$ may be a 128 dimensional set. In other embodiments, other suitable numbers of dimensions may be used. Referring to FIG. 1, the aggregated feature set $r^1$ corresponds to the aggregated feature set r 114 generated by the feature aggregator 104, in an embodiment.

Figure 3:
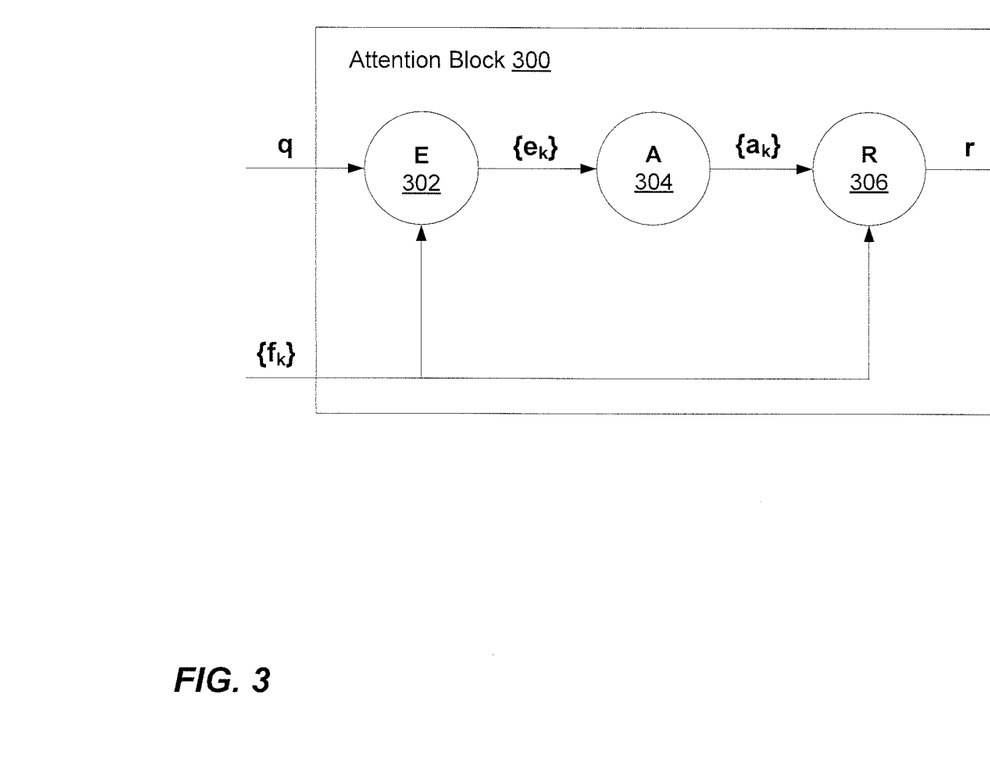
FIG. 3 is a block diagram of an example attention block used with the adaptive feature aggregator of FIG. 2, according to an embodiment.

FIG. 3 is a block diagram of an attention block 300, according to an embodiment. In an embodiment, the attention block 300 corresponds to each of the attention block 202 and the attention bock 204 of FIG. 2. The attention block 300 includes a filtering module E 302, a weight generator A 304, and an aggregator R 306. In operation, the filtering module E 302 receives a plurality of feature sets $\{f_k\}$ and applies a kernel q to each of the feature sets $\{f_k\}$ to generate a plurality of scalar significances $e_k$ corresponding to the plurality of feature sets $\{f_k\}$, where respective ones of the significances $e_k$ correspond to respective ones of the feature sets $f_k$. The kernel q is an initial kernel $q^0$ in the case that the attention block 300 is a first attention block of multiple cascaded attention blocks of a feature aggregator (e.g., the attention block 202 of FIG. 2). On the other hand, in the case that the attention block 300 is not the first attention block of multiple cascaded attention blocks of a feature aggregator (e.g., the attention block 204 of FIG. 2), then the kernel q is a kernel generated by a previous one of the multiple cascaded attention blocks of the feature aggregator (e.g., the kernel $q^1$ generated by the attention block 202 of FIG. 2).

The kernel q may be a data structure, such as a vector, having a number of elements that corresponds to a number of elements in each of feature sets $f_k$. The filtering module E 302 may apply the kernel q to each feature set of the plurality of feature sets $\{f_k\}$ by calculating a dot product between the kernel q and each feature set $f_k$. The filtering module E 302 may generate a set of significances $e_k$ corresponding to the plurality of feature sets $\{f_k\}$ by calculating a dot product according to $$e_k = q^T f_k \qquad \text{Equation 1}$$

where $q^T$ is the transpose of the kernel q.

The weight generator A 304 may generate, based on the scalar significances $e_k$, a set of weights $a_k$ corresponding to the plurality of feature sets $\{f_k\}$, where respective ones of the weights $a_k$ correspond to respective ones of the feature sets $f_k$. For example, the weight generator A 304 may generate the set of weights $a_k$ by normalizing ones of the scalar significances $e_k$ with respect to a combination of the plurality of the scalar significances $e_k$. For example, the weight generator A 304 may generate the set of weights $a_k$ by applying a softmax normalization function to the plurality of scalar significances $e_k$ according to $$a_k = \frac{\exp(e_k)}{\sum_j \exp(e_j)} \qquad \text{Equation 2}$$

The weights generated by the weight generator A 304 may be provided to the aggregator R 306. The aggregator R 306 may generate an aggregated feature set r based on the plurality of feature sets {$f_k$} by calculating a weighted sum of the plurality of feature sets {$f_k$} using the weights $a_k$ generated by the weight generator A 304, according to $$r = \sum_k a_k f_k \qquad \text{Equation 3}$$

In the case that the attention block 300 is the last attention block of multiple cascaded attention blocks of a feature aggregator (e.g., the attention block 204 of FIG. 2), the aggregated feature set r generated by the attention block 300 is the output of the feature aggregator. On the other hand, in the case that the attention block 300 not the last attention block of multiple cascaded attention blocks of a feature aggregator (e.g., the attention block 202 of FIG. 2), the aggregated feature set r generated by the attention block 300 is an initial aggregated feature set $r^0$ that may be used to generate a kernel for the following one of the multiple cascaded attention blocks of the feature aggregator.

As can be seen from equations 1-3, the attention block 300 generally generates a same, order invariant, aggregated feature set r based on multiple feature sets $f_k$ irrespective of an order in which the multiple feature sets $f_k$ are provided to the attention block 300, in an embodiment.

Referring to FIG. 2, the aggregated feature set $r^0$ generated by the first attention block 202 may be provided to the transfer layer 204. The transfer layer 204 may apply a transfer function to the aggregated feature set $r^0$ to generate a kernel $q^1$ based on the aggregated feature set $r^0$. For example, in an embodiment, the transfer layer 204 may generate the kernel $q^1$ based on the aggregated feature set $r^0$ according to $$q^1 = \tan h(Wr^0 + b) \qquad \text{Equation 4}$$

where W is a weight matrix, b is a bias vector, and tan h is a hyperbolic tangential nonlinearity function given by $$\tan h(x) = \frac{\exp(x) - \exp(-x)}{\exp(x) + \exp(-x)} \qquad \text{Equation 5}$$

With continued reference to FIG. 2, the second attention block 206 generally operates in the same manner as the first attention block 202 and as described above with respect to FIG. 3, in an embodiment. Thus, the second attention block 206 may apply the kernel $q^1$ to each feature set $f_k$ of the plurality of feature sets {$f_k$} to generate a plurality of scalar significances $e_k$ corresponding to the plurality of feature sets {$f_k$}, for example by calculating a dot product between the kernel $q^1$ and each feature set $f_k$, a according to Equation 1. The second attention block 206 may then generate, based on the plurality of significances $e_k$, a set of weights $a_k$ corresponding to the plurality of feature sets {$f_k$}, for example by applying a softmax function to the plurality of significances $e_k$ according to Equation 2. The second attention block 206 may then generate an aggregated feature set r based on the plurality of feature sets {$f_k$} by calculating a weighted sum of the plurality of feature sets {$f_k$} using the weights $a_k$ generated by the second attention block 206.

In an embodiment, prior to operation of the feature aggregator 200, training of the feature aggregator 200 may be performed to determine coefficients to be used by the feature aggregator 200. Training of the feature aggregator 200 may involve determining coefficients of the initial kernel $q^0$ to be used by the first attention block 200. Additionally, training of the feature aggregator 200 may involve determining coefficients of the weight matrix W and the bias vector b to be used by the transfer layer 206. Once training is completed, the determined coefficients may be pre-set (e.g., stored in a memory) and may then be used during operation of the feature aggregator 200. The feature aggregator 200 may be trained independently from a feature extractor (e.g., the feature extractor 102) to be used with the feature aggregator 200. Alternatively, end-to-end system training may be performed to collectively train the feature aggregator 200 and a feature extractor (e.g., the feature extractor 102) to be used with the feature aggregator 200.

To collectively train the feature aggregator 200 and a feature extractor (e.g., the feature extractor 102) to be used with the feature aggregator 200, for subject identification, coefficients of the feature aggregator and the feature extractor may be optimized by minimizing, using a plurality of videos with known subjects (e.g., known faces), an average classification loss function given by $$l_i = -\log p_{i,y_i} \qquad \text{Equation 6}$$

where $y_i$ is the target label of the i-th video instance used for training, and $p_{i,y_i}$ is given by $$p_{i,y_i} = \frac{\exp(p_{i,y_i})}{\sum_z \exp(p_{i,z})} \qquad \text{Equation 7}$$

where $p_{i,z}$ is z-th outputs of a fully-connected (FC) prediction layer.

To collectively train the feature aggregator 200 and a feature extractor (e.g., the feature extractor 102) to be used with the feature aggregator 200, for subject verification, a Siamese structure with contrastive loss may be used. In this case, two video processing systems such as the video processing system 100 of FIG. 1 with shared coefficients may be used. Respective videos may be provided to each of the two video processing systems, and verification decisions may be made. Average constructive loss may be minimized, where the construction lass may be given by $$l_{i,j} = y_{i,j} \|r_i^l - r_j^l\|_2^2 + (1 - y_{i,j}) \max(0, m - \|r_i^l - r_j^l\|_2^2) \qquad \text{Equation 6}$$

where $y_{i,j}$ is equal to 1 if the respective videos are of the same identity and $y_{i,j}$ is equal to 0 if the respective videos are of different identities.

Figure 4:
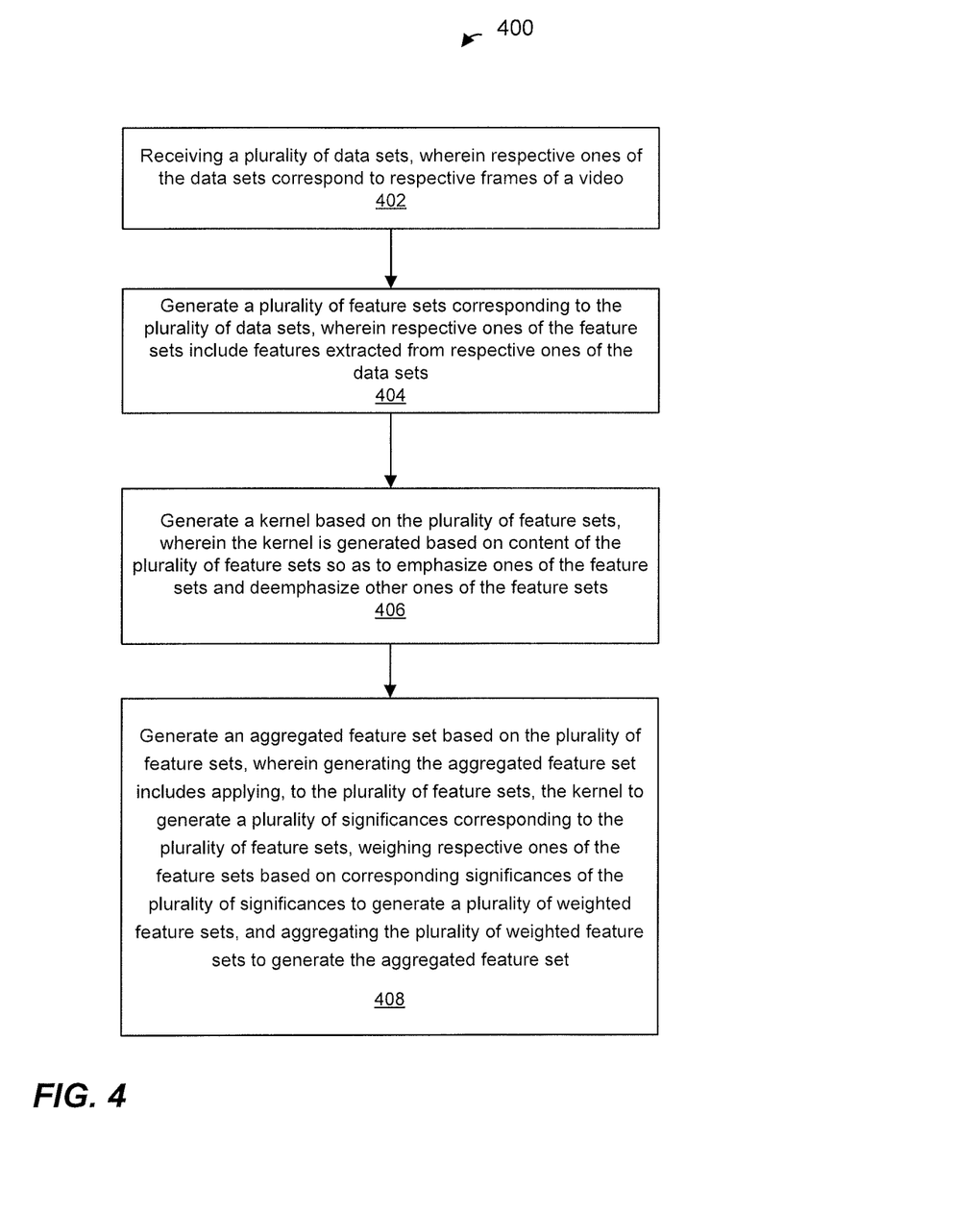
FIG. 4 is a flow diagram illustrating an example method for processing video frames in the video image processing system of FIG. 1, according to an embodiment.

FIG. 4 is a flow diagram of a method 400 for processing video frames in a video image processing system, according to an embodiment. In an embodiment, the method 400 is implemented by the video processing system 100 of FIG. 1. In an embodiment, parts of the method 400 are implemented by the frame aggregator 200 of FIG. 2. In other embodiments, the method 400 is implemented by video image processing systems different from the video processing system 100 of FIG. 1 and/or parts of the method 400 are implemented by a frame aggregator different from the frame aggregator 200 of FIG. 2.

At block 402, a plurality of data sets may be received. Respective ones of the data sets received at block 402 may correspond to respective frames of a video. At block 404, a plurality of feature sets may be generated based on the plurality of data sets received at block 402. Respective ones of the feature sets generated at block 404 may include features extracted from respective data sets corresponding to respective ones of the frames of the video.

At block 406, a kernel may be generated based on content of the plurality of feature sets generated at block 404. The kernel may be generated so as to emphasize ones of the feature sets and deemphasize other ones of the feature sets. The kernel may be a weighted combination of the feature sets. For example, the kernel may be generated by applying an initial kernel to the feature sets to generate a plurality of initial significances respectively corresponding to the feature sets, and then aggregating the feature sets by calculating a weighted combination of the feature sets, where the weights for combining the feature sets are determined based on the significances corresponding to the feature sets.

At block 408, an aggregated feature set may be generated. Generating the aggregated feature set may include applying, to the plurality of feature sets generated at block 404, the kernel generated at block 406 to generate a plurality of significances corresponding to the plurality of feature sets, and weighing respective ones of the feature sets based on corresponding significances of the plurality of significances to generate a plurality of weighted feature sets. The plurality of weighted feature sets may be combined to generate the aggregated feature set.

Figure 5:
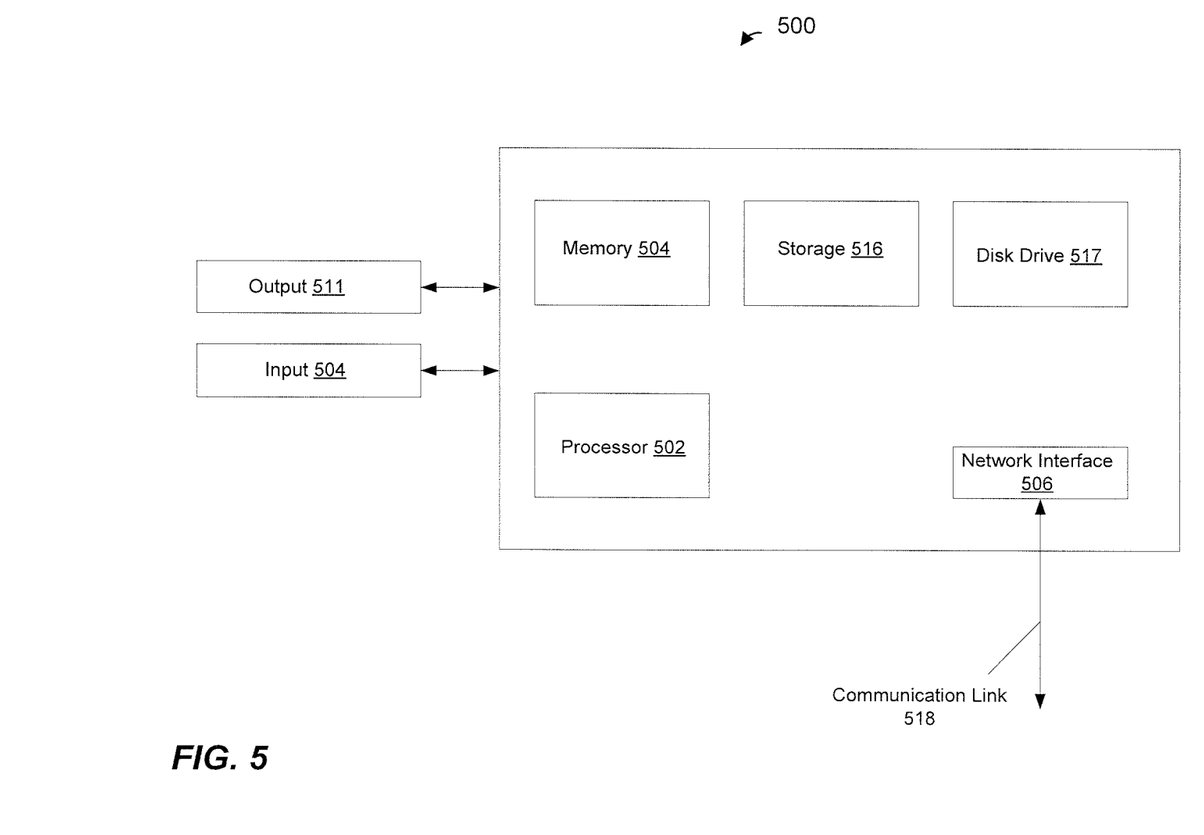
FIG. 5 is a block diagram of a computer system suitable for implementing one or more components of the video image processing system of FIG. 1, according to an embodiment.

FIG. 5 is a block diagram of a computing system 500 suitable for implementing one or more embodiments of the present disclosure. In its most basic configuration, the computing system 500 may include at least one processor 502 and at least one memory 504. The computing device 500 may also a bus (not shown) or other communication mechanism for communicating information data, signals, and information between various components of computer system 500. Components may include an input component 504 that processes a user action, such as selecting keys from a keypad/keyboard, selecting one or more buttons or links, etc., and sends a corresponding signal to the at least one processor 502. Components may also include an output component, such as a display, 511 that may display, for example, results of operations performed by the at least one processor 502. A transceiver or network interface 506 may transmit and receive signals between computer system 500 and other devices, such as user devices that may utilize results of processes implemented by the computer system 500. In one embodiment, the transmission is wireless, although other transmission mediums and methods may also be suitable.

The at least one processor 502, which can be a micro-controller, digital signal processor (DSP), or other processing component, processes these various signals, such as for display on computer system 500 or transmission to other devices via a communication link 518. The at least one processor 502 may also control transmission of information, such as cookies or IP addresses, to other devices. The at least one processor 502 may execute computer readable instructions stored in the memory 504. The computer readable instructions, when executed by the at least one processor 502, may cause the at least one processor 502 to implement processes associated with video frame processing and/or recognition of a subject based on a plurality of video frames.

Components of computer system 500 may also include at least one static storage component 516 (e.g., ROM) and/or at least one disk drive 517. Computer system 500 may perform specific operations by processor 512 and other components by executing one or more sequences of instructions contained in system memory component 514. Logic may be encoded in a computer readable medium, which may refer to any medium that participates in providing instructions to the at least one processor 502 for execution. Such a medium may take many forms, including but not limited to, non-transitory media, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

While various operations of a video processing system have been described herein in terms of "modules" or "components," it is noted that terms are not limited to single units or functions. Moreover, functionality attributed to some of the modules or components described herein may be combined and attributed to fewer modules or components. Further still, while the present invention has been described with reference to specific examples, those examples are intended to be illustrative only, and are not intended to limit the invention. It will be apparent to those of ordinary skill in the art that changes, additions or deletions may be made to the disclosed embodiments without departing from the spirit and scope of the invention. For example, one or more portions of methods described above may be performed in a different order (or concurrently) and still achieve desirable results.

What is claimed is:

1. A video frame processing system comprising:
a feature extractor configured to
receive a plurality of data sets, wherein respective ones of the data sets correspond to respective frames of a video, and
generate a plurality of feature sets corresponding to the plurality of data sets, wherein respective ones of the feature sets include multiple corresponding features extracted from respective ones of the data sets; and
a feature aggregator having a first stage and a second stage, the feature aggregator configured to
generate, in the first stage based on the plurality of feature sets, a kernel for the second stage, wherein the kernel is adapted to content of the plurality of feature sets so as to emphasize ones of the feature sets and deemphasize other ones of the feature sets, and
generate, in the second stage based on the plurality of feature sets, an aggregated feature set, wherein generating the aggregated feature set includes
applying, to the plurality of feature sets, the kernel to generate a plurality of significances corresponding to the plurality of feature sets,
weighing respective ones of the feature sets based on corresponding significances of the plurality of significances to generate a plurality of weighted feature sets, and
aggregating the plurality of weighted feature sets to generate the aggregated feature set, wherein the aggregated feature set includes respective combinations of ones of multiple weighted features corresponding to respective ones of the multiple features extracted from respective ones of the data sets.

2. The video frame processing system of claim 1, wherein the feature aggregator is configured to, in the first stage
apply an initial kernel to the plurality of feature sets to generate an initial plurality of significances corresponding to the plurality of feature sets,
normalize ones of the significances in the plurality of initial significances with respect to a combination of the plurality of initial significances to generate a plurality of initial normalized weights, and
aggregate the plurality of feature sets to generate an initial aggregated feature set, wherein aggregating the plurality of feature sets includes applying respective ones of the plurality of initial normalized weights to corresponding feature sets of the plurality of feature sets.

3. The video frame processing system of claim 2, wherein the feature aggregator is further configured to apply a transfer layer to the initial aggregated feature set to generate the kernel.

4. The video frame processing system of claim 3, wherein applying the transfer layer to the initial aggregated feature set to generate the kernel comprises
applying a weight matrix W to the initial aggregated feature set to generate a weighted initial aggregated feature set,
biasing the weighted initial aggregated feature set by a bias vector b to generate a biased weighted initial aggregated feature set, and
applying a tangential hyperbolic nonlinearity function to the biased weighted initial aggregated feature set to generate the kernel.

5. The video frame processing system of claim 4, wherein coefficients of a neural network used by the feature extractor to generate the plurality of feature sets and coefficients used by the feature aggregator to generate the aggregated feature set are collectively determined based on end-to-end training of the video frame processing system, wherein determining the coefficients used by the feature aggregator includes determining elements of one or more of (i) the initial kernel, (ii) the weight matrix W and (iii) the bias vector b.

6. The video frame processing system of claim 5, wherein coefficients of a neural network used by the feature extractor to generate the plurality of feature sets and coefficients used by the feature aggregator to generate the aggregated feature set are determined based on individual training of the feature extractor and the feature aggregator, wherein determining the coefficients used by the feature aggregator includes determining elements of one or more of (i) the initial kernel, (ii) the weight matrix W and (iii) the bias vector b.

7. The video frame processing system of claim 1, wherein the feature aggregator is further configured to, in the second stage, normalize ones of the significances of the plurality of significances with respect to a combination of the plurality of significances to generate a plurality of normalized weights, and wherein weighing respective ones of the feature sets includes applying respective ones of the plurality of normalized weights to corresponding feature sets of the plurality of feature sets.

8. The video frame processing system of claim 1, wherein the feature extractor comprises a convolutional neural network (CNN) configured to generate the plurality of feature sets.

9. The video frame processing system of claim 1, further comprising a decision generator configured to generate a recognition decision for at least one subject in the video, wherein the recognition decision is one of (i) subject verification decision or (ii) subject recognition decision.

10. A tangible, non-transitory computer readable medium, or media, storing machine readable instructions that, when executed by one or more processors, cause the one or more processors to:
receive a plurality of data sets, wherein respective ones of data sets correspond to respective frames of a video;
generate a plurality of feature sets corresponding to the plurality of data sets, wherein respective ones of the feature sets include multiple corresponding features extracted from respective ones of the data sets;
generate, in a first stage of a feature aggregator based on the plurality of feature sets, a kernel for a second stage of the feature aggregator, wherein the kernel is adapted to content of the plurality of feature sets so as to emphasize ones of the feature sets and deemphasize other ones of the feature sets, and
generate, in the second stage based on the plurality of feature sets, an aggregated feature set, wherein generating the aggregated feature set includes
applying, to the plurality of feature sets, the kernel to generate a plurality of significances corresponding to the plurality of feature sets,
weighing respective ones of the feature sets based on corresponding significances of the plurality of significances to generate a plurality of weighted feature sets, and
aggregating the plurality of weighted feature sets to generate the aggregated feature set, wherein the aggregated feature set includes respective combinations of ones of multiple weighted features corresponding to respective ones of the multiple features extracted from respective ones of the data sets.

11. The non-transitory computer-readable medium or media of claim 10, wherein the machine readable instructions, when executed by the one or more processors, cause the one or more processors to:
apply an initial kernel to the plurality of feature sets to generate an initial plurality of significances corresponding to the plurality of feature sets,
normalize ones of the significances in the plurality of initial significances with respect to a combination of the plurality of initial significances to generate a plurality of initial normalized weights, and
aggregate the plurality of feature sets to generate an initial aggregated feature set, wherein aggregating the plurality of feature sets includes applying respective weights of the plurality of initial normalized weights to corresponding feature sets of the plurality of feature sets.

12. The non-transitory computer-readable medium or media of claim 11, further storing machine readable instructions that, when executed by the one or more processors, cause the one or more processors to apply a transfer layer to the initial aggregated feature set to generate the kernel.

13. The non-transitory computer-readable medium or media of claim 12, wherein the machine readable instructions, when executed by one or more processors, cause the one or more processors to apply the transfer layer to the initial aggregated feature set at least by:
applying a weight matrix W to the initial aggregated feature set to generate a weighted initial aggregated feature set,
biasing the weighted initial aggregated feature set by a bias vector b to generate a biased weighted initial aggregated feature set, and
applying a tangential hyperbolic nonlinearity function to the biased weighted initial aggregated feature set to generate the kernel.

14. The non-transitory computer-readable medium or media of claim 13, wherein coefficients of a neural network used for generating the plurality of feature sets and coefficients used for generating the aggregated feature set are collectively determined based on end-to-end training of the video frame processing system, wherein determining the coefficients used by the feature aggregator includes determining elements of one or more of (i) the initial kernel, (ii) the weight matrix W and (iii) the bias vector b.

15. The non-transitory computer-readable medium or media of claim 13, wherein coefficients of a neural network used for generating the plurality of feature sets and coefficients used for generating the aggregated feature set are obtained based on individual training of the feature extractor and the feature aggregator, wherein determining the coefficients used by the feature aggregator includes determining elements of one or more of (i) the initial kernel, (ii) the weight matrix W and (iii) the bias vector b.

16. The non-transitory computer-readable medium or media of claim 14, wherein the machine readable instructions, when executed by one or more processors, cause the one or more processors to normalize ones of the significances in the plurality of significances with respect to a combination of the plurality of significances to generate a plurality of normalized weights, and apply respective weights of the plurality of normalized weights to corresponding feature sets of the plurality of feature sets.

17. A method for processing video frames in a video image processing system, the method comprising:
receiving, at a processor, a plurality of data sets, wherein respective ones of the data sets correspond to respective frames of a video, and
generating, with the processor, a plurality of feature sets corresponding to the plurality of data sets, wherein respective ones of the feature sets include multiple corresponding features extracted from respective ones of the data sets;
generating, with the processor, a kernel based on the plurality of feature sets, wherein the kernel is generated based on content of the plurality of feature sets so as to emphasize ones of the feature sets and deemphasize other ones of the feature sets;
generating, with the processor, an aggregated feature set based on the plurality of feature sets, wherein generating the aggregated feature set includes
applying, to the plurality of feature sets, the kernel to generate a plurality of significances corresponding to the plurality of feature sets,
weighing respective ones of the feature sets based on corresponding significances of the plurality of significances to generate a plurality of weighted feature sets, and
aggregating the plurality of weighted feature sets to generate the aggregated feature set, wherein the aggregated feature set includes respective combinations of ones of multiple weighted features corresponding to respective ones of the multiple features extracted from respective ones of the data sets.

18. The method of claim 17, wherein generating the kernel comprises
applying an initial kernel to the plurality of feature sets to generate an initial plurality of significances corresponding to the plurality of feature sets,
normalizing ones of the significances in the plurality of initial significances with respect to other ones of the significances in the plurality of initial significances to generate a plurality of initial normalized weights, and
aggregating the plurality of feature sets to generate an initial aggregated feature set, wherein combining the plurality of feature sets includes applying respective weights of the plurality of initial normalized weights to corresponding feature sets of the plurality of feature sets, and
applying a transfer layer to the initial aggregated feature set to generate the kernel.

19. The method of claim 17, wherein applying the transfer layer to the initial aggregated feature set to generate the kernel comprises
applying a weight matrix W to the initial aggregated feature set to generate a weighted initial aggregated feature set,
biasing the weighted initial aggregated feature set by a bias vector b to generate a biased weighted initial aggregated feature set, and
applying a tangential hyperbolic nonlinearity function to the biased weighted initial aggregated feature set to generate the kernel.

20. The method of claim 17, further comprising normalizing ones of the significances in the plurality of significances with respect to a combination of the significances in the plurality of significances to generate a plurality of normalized weights, and wherein weighing respective ones of the feature sets based on corresponding significances of the plurality of significances includes applying respective weights of the plurality of normalized weights to corresponding feature sets of the plurality of feature sets.

\* \* \* \* \*